(12) United States Patent
Huang-Fu et al.

(10) Patent No.: US 11,159,976 B2
(45) Date of Patent: Oct. 26, 2021

(54) HANDLING OF MAPPED EPS BEARER CONTEXT FOR INVALID QOS FLOW DESCRIPTION

(71) Applicant: MEDIATEK INC., Hsin-Chu (TW)

(72) Inventors: Chien-Chun Huang-Fu, Hsin-Chu (TW); Shang-Ru Mo, Hsin-Chu (TW); Chi-Hsien Chen, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 154 days.

(21) Appl. No.: 16/687,166

(22) Filed: Nov. 18, 2019

(65) Prior Publication Data

US 2020/0162968 A1 May 21, 2020

Related U.S. Application Data

(60) Provisional application No. 62/769,021, filed on Nov. 19, 2018.

(51) Int. Cl.
*H04W 36/00* (2009.01)
*H04W 76/18* (2018.01)
(Continued)

(52) U.S. Cl.
CPC ... *H04W 28/0268* (2013.01); *H04W 36/0022* (2013.01); *H04W 36/0044* (2013.01);
(Continued)

(58) Field of Classification Search
CPC ......... H04W 28/0268; H04W 36/0022; H04W 36/0044; H04W 56/001; H04W 76/10;
(Continued)

(56) References Cited

U.S. PATENT DOCUMENTS 10,306,580 B1 * 5/2019 Gupta ............... H04W 8/02
11,026,127 B2 * 6/2021 Huang-Fu ......... H04W 76/32
(Continued)

FOREIGN PATENT DOCUMENTS

CN      1738285 A     8/2004
CN    108353310 A    11/2015
(Continued)

OTHER PUBLICATIONS

Taiwan IPO, office action for the TW patent application 108141885 (no English translation is available) dated Dec. 22, 2020 (7 pages).
(Continued)

*Primary Examiner* — Ahmed Elallam
(74) *Attorney, Agent, or Firm* — Imperium Patent Works; Zheng Jin (57) ABSTRACT

A method of handling mapped Evolved Packet System (EPS) bearer context for invalid QoS flow description is proposed. During a PDU session establishment procedure or a PDU session modification procedure, a UE may receive a mapped EPS bearer context IE for creating a new mapped EPS bearer of a PDU session. If there is no corresponding QoS flow description associated to the new mapped EPS bearer, e.g., if there is no corresponding authorized QoS flow description IE in the PDU session establishment accept message or in the PDU session modification command message, then the UE should send another PDU session modification request message to the network to delete the new mapped EPS bearer context.

20 Claims, 4 Drawing Sheets

(51) Int. Cl.
  *H04W 28/02* (2009.01)
  *H04W 76/10* (2018.01)
  *H04W 88/02* (2009.01)
  *H04W 80/10* (2009.01)
  *H04W 56/00* (2009.01)
  *H04W 76/30* (2018.01)

(52) U.S. Cl.
  CPC ......... *H04W 56/001* (2013.01); *H04W 76/10* (2018.02); *H04W 76/30* (2018.02); *H04W 80/10* (2013.01); *H04W 88/023* (2013.01)

(58) Field of Classification Search
  CPC ..... H04W 76/11; H04W 76/20; H04W 76/30; H04W 80/10; H04W 88/023; H04W 28/0263; H04W 36/0033; H04W 76/19; H04W 76/18
  See application file for complete search history.

(56) References Cited

U.S. PATENT DOCUMENTS

| | | | | |
|---|---|---|---|---|
| 11,051,224 | B2* | 6/2021 | Jin | H04W 28/0268 |
| 2013/0077503 | A1 | 3/2013 | Chaudhuri et al. | 370/252 |
| 2017/0245184 | A1 | 8/2017 | Nagesh Shetigar et al. | |
| 2018/0192333 | A1 | 7/2018 | Wu | |
| 2018/0198867 | A1 | 7/2018 | Dao et al. | |
| 2018/0324632 | A1 | 11/2018 | Cho et al. | |
| 2018/0376445 | A1 | 12/2018 | Yoon et al. | |
| 2019/0124181 | A1 | 4/2019 | Park | H04W 74/0833 |
| 2019/0159157 | A1 | 5/2019 | Gupta | H04W 60/005 |
| 2019/0215724 | A1 | 7/2019 | Fard | H04L 43/28 |
| 2019/0261449 | A1 | 8/2019 | Kim | H04W 48/16 |
| 2020/0037197 | A1* | 1/2020 | Cho | H04W 28/0263 |
| 2020/0037386 | A1 | 1/2020 | Park | H04W 76/30 |
| 2020/0077315 | A1* | 3/2020 | Jin | H04W 36/14 |
| 2021/0144579 | A1 | 5/2021 | Ke | H04W 28/263 |
| 2021/0168595 | A1* | 6/2021 | Sun | H04W 12/02 |

FOREIGN PATENT DOCUMENTS

| | | |
|---|---|---|
| CN | 107690161 A | 8/2016 |
| CN | 108702723 A | 11/2016 |
| CN | 108605269 A | 1/2017 |
| CN | 108632917 A | 3/2017 |
| CN | 108370600 A | 5/2017 |
| CN | 108513726 A | 5/2017 |
| CN | 108260162 A | 1/2018 |
| EP | 3637683 A1 | 5/2017 |

OTHER PUBLICATIONS

Taiwan IPO, office action for the TW patent application 108140942 (no English translation is available) dated Jan. 29, 2021 (8 pages).
TR 24.890 V15.1.0 (Mar. 2018), 3rd Generation Partnership Project; technical Specification Group Core Network and Terminals; 5G System—Phase 1; CT WG1 Aspects (Release 15) *sections 6 to 12*.
International Search Report and Written Opinion of International Search Authority for PCT/CN2019/117474 dated Jan. 21, 2020 (9 pages).
TR 24.890 v15.1.0 (Mar. 2018), 3rd Generation Partnership Project; technical Specification Group Core Network and Terminals; 5G System—Phase 1; CT WG1 Aspects (Release 15) *sections 6.7.4, 6.7.5, 9.5, and 9.6*.
International Search Report and Written Opinion of International Search Authority for PCT/CN2019/119452 dated Feb. 10, 2020 (10 pages).
TS 24.501 V15.5.0 (Sep. 2019), Non-Access-Stratum (NAS) protocol for 5G System (5GS): Stage 3 (Release 15) * 6.4.1.3 UE-requested PDT session establishment procedure accepted by the network*, *p. 265*.
International Search Report and Written Opinion of International Search Authority for PCT/CN2019/119453 dated Jan. 19, 2020 (9 pages).
Taiwan IPO, office action for the TW patent application 108141883 (no English translation is available) dated Aug. 24, 2020 (8 pages).
USPTO Office Action for related U.S. Appl. No. 16/686,868, dated Jun. 8, 2021.
USPTO Office Action for related U.S. Appl. No. 16/680,325, dated May 13, 2021.

* cited by examiner

HANDLING OF MAPPED EPS BEARER CONTEXT FOR INVALID QOS FLOW DESCRIPTION

CROSS REFERENCE TO RELATED APPLICATIONS

This application claims priority under 35 U.S.C. § 119 from U.S. Provisional Application No. 62/769,021, entitled "5GSM Congestion Control", filed on Nov. 19, 2018, the subject matter of which is incorporated herein by reference.

TECHNICAL FIELD

The disclosed embodiments relate generally to wireless communication, and, more particularly, to method of handling of mapped EPS bearer context for invalid Quality of Service (QoS) flow description in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G, a Protocol Data Unit (PDU) session establishment is a parallel procedure of a Packet Data Network (PDN) connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Each QoS flow may include multiple QoS rules consisting of QoS profile, packet filters, and precedence order.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. This implies that the mapped/associated EPS bearer context should not exist if there is no corresponding QoS flow description. Otherwise, after inter-system change (e.g., from 5GS to EPS), if an EPS bearer is established based on the mapped EPS bearer context without QoS flow description, the associated QoS flow is undefined.

The same principle applies to the PDU session establishment and modification procedures when mapped EPS bearer context IE is provided. A solution is sought if mapped EPS bearer context IE is provided without associated QoS flow description.

SUMMARY

A method of handling mapped Evolved Packet System (EPS) bearer context for invalid QoS flow description is proposed. During a PDU session establishment procedure or a PDU session modification procedure, a UE may receive a mapped EPS bearer context IE for creating a new mapped EPS bearer of a PDU session. If there is no corresponding QoS flow description associated to the new mapped EPS bearer, e.g., if there is no corresponding authorized QoS flow description IE in the PDU session establishment accept message or in the PDU session modification command message, then the UE should send another PDU session modification request message to the network to delete the new mapped EPS bearer context.

In one embodiment, a UE receives a Protocol data unit (PDU) session related message for a PDU session in a mobile communication network. The PDU session related message carries a mapped evolved packet system (EPS) bearer context information element (IE) associated to the PDU session. The UE determines that the mapped EPS bearer context IE comprises a new mapped EPS bearer to be created and stored at the UE for the PDU session. The new mapped EPS bearer has an EPS bearer identity (EBI). The UE detects that no QoS flow at the UE is associated with the new mapped EPS bearer. The UE deletes the new mapped EPS bearer using explicit signaling.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
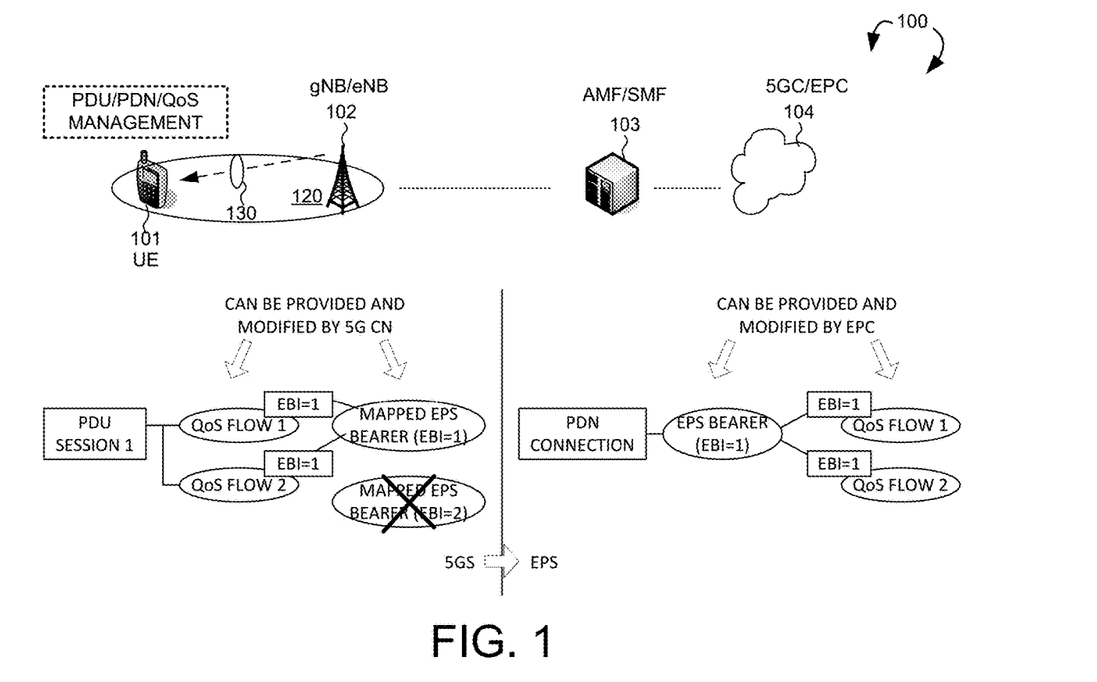
FIG. 1 illustrates an exemplary 5G network supporting Protocol Data Unit (PDU) session and Quality of Service (QoS) rule management with inter-system change and handling of mapped Evolved Packet System (EPS) bearer context in accordance with one novel aspect.

FIG. 1 illustrates an exemplary 5G network 100 supporting Protocol Data Unit (PDU) session and Quality of Service (QoS) rule management with inter-system change and handling of mapped Evolved Packet System (EPS) bearer context in accordance with one novel aspect. 5G new radio (NR) network 100 comprises a user equipment UE 101, a base station gNB 102, an access and Mobility Management Function (AMF)/Session Management Function (SMF) 103, and a 5G core network 5GC 104. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF/SMF 103 communicates with gNB 102 and 5GC 104 for access and mobility management and PDU session management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS networks are packet-switched (PS) Internet Protocol (IP) networks. This means that the networks deliver all data traffic in IP packets, and provide users with Always-On IP Connectivity. When UE joins a 5GS network, a Packet Data Network (PDN) address (i.e., the one that can be used on the PDN) is assigned to the UE for its connection to the PDN. In 4G, EPS has defined a Default EPS Bearer to provide the IP Connectivity that is Always-On. In 5G, a Protocol Data Unit (PDU) session establishment procedure is a parallel procedure of a PDN connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. This implies that the mapped/ associated EPS bearer context should not exist if there is no corresponding QoS flow description. Otherwise, after inter-system change (e.g., from 5GS to EPS), if an EPS bearer is established based on the mapped EPS bearer context without QoS flow description, the associated QoS flow is undefined. This principle applies to PDU session establishment and modification procedures when mapped EPS bearer context IE is provided.

In the example of FIG. 1, UE 101 establishes a PDU session 1, which includes QoS flow1 and QoS flow2 in Non-Access Stratum (NAS) layer. QoS flow1 has a mapped EPS bearer with EBI=1, and QoS flow2 also has a mapped EPS bearer with EBI=1. UE 101 also receives a mapped EPS bearer context IE containing instruction to create a mapped EPS bearer with EBI=2. However, the mapped EPS bearer with EBI=2 is not associated with any corresponding QoS flow description. In accordance with one novel aspect, UE 101 does not create and store the mapped EPS bearer with EBI=2. Instead, UE 101 removes the mapped EPS bearer with EBI=2 by explicit signaling. As a result, when inter-system change occurs from 5GS to EPS, the PDU session 1 is converted to a corresponding PDN connection. The PDN connection has an established EPS bearer with EBI=1, which is associated to QoS flow1 and QoS flow2. Because the mapped EPS bearer with EBI=2 is already deleted in 5GS, UE 101 does not need to establish any EPS bearer that has no QoS flow description in EPS.

Figure 2:
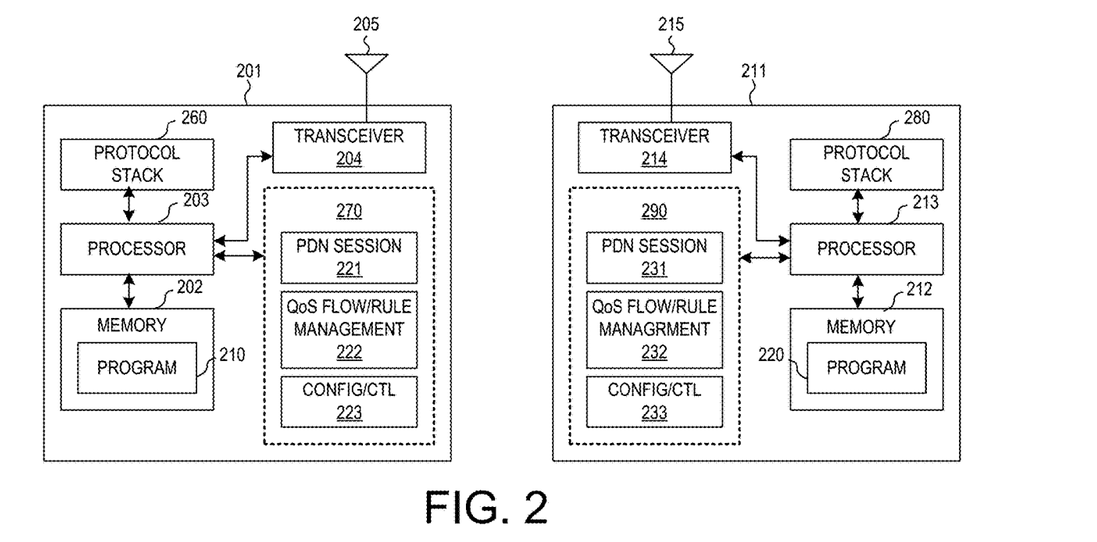
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session handling circuit 231 handles PDU session establishment and modification procedures. QoS flow and QoS rule management circuit 232 creates, modifies, and deletes QoS flows and QoS rules for UE. Configuration and control circuit 233 provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA)

circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a QoS flow and rule management circuit 222 that manages, creates, modifies, and deletes QoS flows and QoS rules, a config and control circuit 223 that handles configuration and control parameters for mobility management and session management. If a mapped EPS bearer context IE is provided by the network to create a mapped EPS bearer without associated QoS flow description at UE side, then UE removes the mapped EPS bearer context by explicit signaling to the network.

Figure 3:
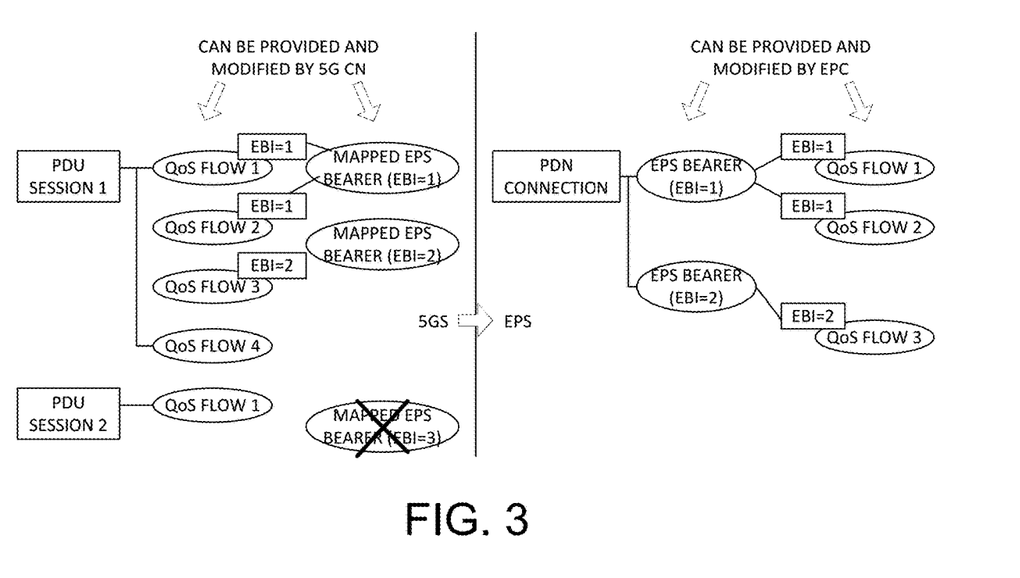
FIG. 3 illustrates one embodiment of inter-system change from 5GS to EPS supporting PDU session to PDN connection mapping and handling mapped EPS bearer context associated with QoS flow descriptions.

FIG. 3 illustrates one embodiment of inter-system change from 5GS to EPS supporting PDU session to PDN connection conversion and handling mapped EPS bearer context associated with QoS flow descriptions. A PDU session establishment in 5G is a parallel procedure of a PDN connection procedure in 4G. A PDU session defines the association between the UE and the data network that provides a PDU connectivity service. Each PDU session is identified by a PDU session ID, and may include multiple QoS flows and QoS rules in Non-Access Stratum (NAS) layer. In the example of FIG. 3, PDU session 1 includes QoS flow1, QoS flow2, QoS flow3, and QoS flow4; and PDU session 2 includes QoS flow1. Each QoS flow in NAS layer needs to be supported by a mapping Data Radio Bearer (DRB) in Access Stratum (AS) layer.

When inter-system change occurs from 5GS to EPS, PDU sessions are converted to PDN connections, and mapping EPS bearers need to be established in 4G EPS for supporting corresponding QoS flows. In the example of FIG. 3, for PDU session 1, QoS flow1 is associated to a mapped EPS bearer with EBI=1, QoS flow2 is also associated to the mapped EPS bearer with EBI=1, and QoS flow3 is associated to a mapped EPS bearer with EBI=2. QoS flow4 in PDU session 1 and QoS flow1 in PDU session 2 have no association of mapped EPS bearer context. If a mapped EPS bearer context with EBI=3 is to be created but is not associated with any QoS flow, then it will be deleted by the UE. Upon intersystem change from 5GS to EPS, PDU session 1 is converted to a corresponding PDN connection. The PDN connection has an established EPS bearer with EBI=1, which is associated to QoS flow1 and QoS flow2, and another established EPS bearer with EBI=2, which is associated to QoS flow3. QoS flow4 is not transferred to EPS, i.e., it is locally released by the UE upon inter-system change. In addition, because the mapped EPS bearer with EBI=3 is already deleted by the UE in 5GS, the UE does not need to establish any EPS bearer that has no QoS flow description in EPS.

Figure 4:
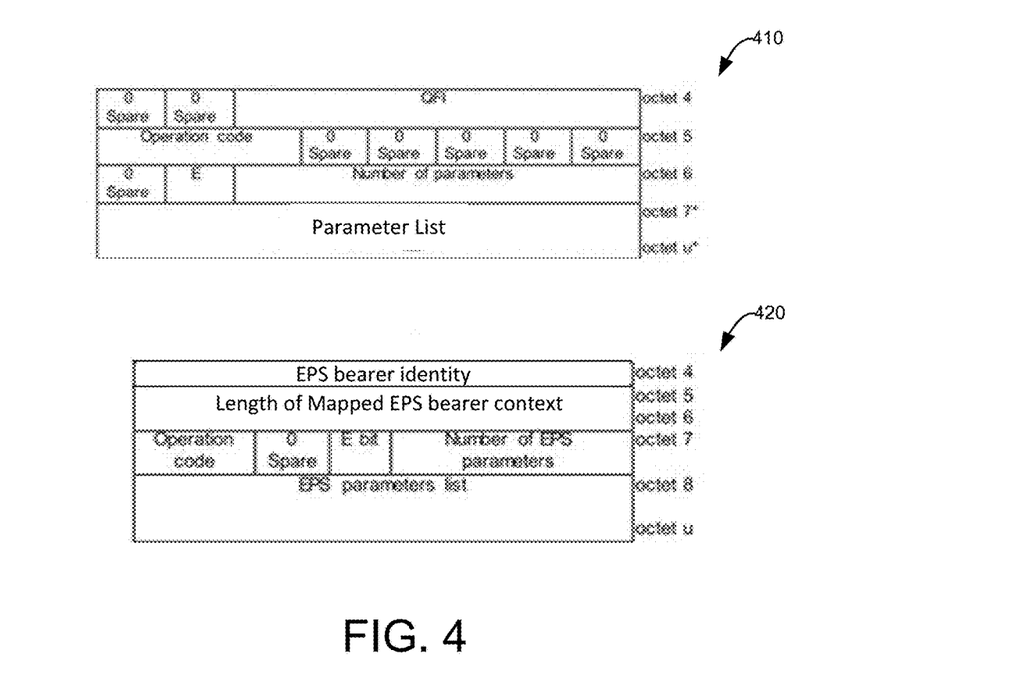
FIG. 4 illustrates one embodiment of a QoS flow description identified by a QoS flow identity (QFI) and one embodiment of a mapped EPS bearer context identified by an EPS bearer identity (EBI).

FIG. 4 illustrates one embodiment of a QoS flow description identified by a QoS flow identity (QFI) and one embodiment of a mapped EPS bearer context identified by an EPS bearer identity (EBI). For QoS flow configuration, the network can provide a QoS flow description IE to the UE, which comprises a list of QoS flow descriptions. Each QoS flow description, as depicted by 410 of FIG. 4, comprises a QFI, a QoS flow operation code, a number of QoS flow parameters, and a QoS flow parameter list. As defined by the 3GPP specification, a parameter identifier field is used to identify each parameter included in the parameter list and it contains the hexadecimal coding of the parameter identifier. For example, the following parameter identifiers are specified: 01H (5QI), 02H (GFBR uplink), 03H (GFBR downlink), 04H (MFBR uplink), 05H (MFBR downlink), 06H (averaging window), 07H (EPS bearer identity). It can be seen that one of the parameter identifiers is EBI, which is used to identify the EPS bearer that is mapped to or associated with the QoS flow. For mapped EPS bearer configuration, the network can provide a mapped EPS bearer context IE, which comprises a list of mapped EPS bearer contexts. Each mapped EPS bearer context, as depicted by 420 of FIG. 4, comprises an EBI, a length of mapped EPS bearer context, an EPS bearer operation code, a number of EPS bearer parameters, and an EPS bearer parameter list. Each mapped EPS bearer context is associated to a QoS flow through the EBI.

When creating new mapped EPS bearer, and when deleting existing QoS flow, UE needs to make sure that all mapped EPS bearers have corresponding QoS flow descriptions. In one example, if a new mapped EPS bearer context with "create new EPS bearer" operation code is provided by the network to a UE, and the new mapped EPS bearer context has no associated QoS flow description, then the UE will remove the new mapped EPS bearer context by explicit signaling. In another example, a QoS flow is associated with an existing mapped EPS bearer, if the QoS flow is to be deleted with "delete QoS flow" operation code, then the UE needs to check whether the existing mapped EPS bearer context has any other corresponding QoS flow description after the QoS flow is deleted. If so, then the UE will remove the existing mapped EPS bearer context by explicit signaling.

Figure 5:
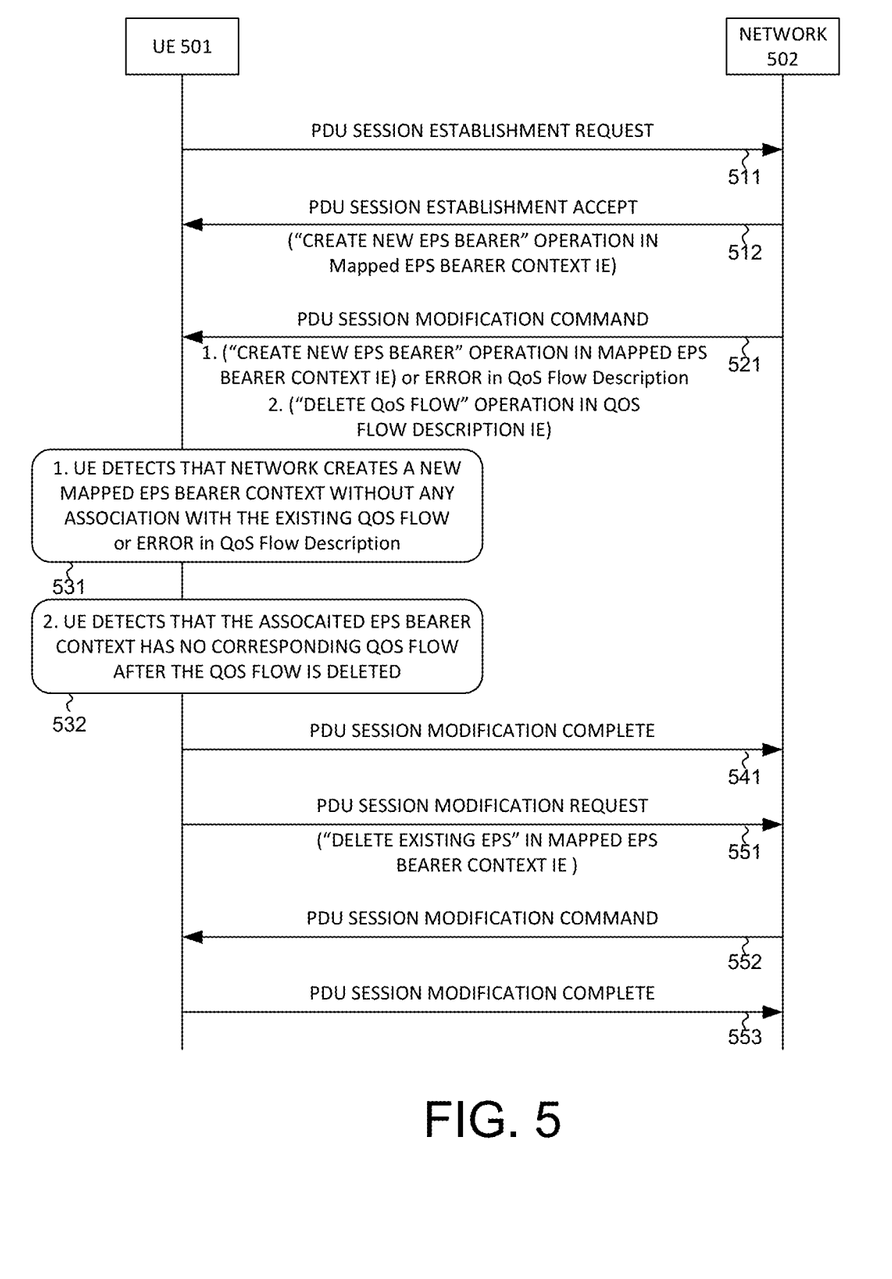
FIG. 5 illustrates a sequence flow between a UE and a network entity for PDU session establishment and modification procedures handling mapped EPS bearer context for invalid QoS flow description in accordance with one novel aspects.

FIG. 5 illustrates a sequence flow between a UE and a network entity for PDU session establishment and modification procedures handling mapped EPS bearer context for invalid QoS flow description in accordance with one novel aspects. In step 511, UE 501 sends a PDU session establishment request message to network 502. In step 512, UE 501 receives a PDU session establishment accept message from network 502 to establish the PDU session. If the PDU session is successfully established, the UE NAS layer indicates the attributes of the established PDU session (e.g., PDU session ID (PSI), Service and Session Continuity (SSC) mode, Single-Network Slice Selection Assistance Information (S-NSSAI), Data Network Name (DNN), PDU session type, access type, PDU address, etc.), and provides information (e.g., PDU address) of the established PDU session to the upper layers. The PDU session establishment accept message carries instructions for UE 501 to add new authorized QoS flow descriptions and new mapped EPS bearer contexts (e.g., via QoS flow description IE and mapped EPS bearer context IE).

After PDU session establishment, in step 521, UE 501 receives a PDU session modification command message from network 502. The PDU session modification command message may carry instructions for UE 501 to add new QoS flow descriptions, to delete existing QoS flow descriptions, to add new mapped EPS bearer contexts, or to delete existing mapped EPS bearer contexts (e.g., via QoS flow description IE and mapped EPS bearer context IE). In step 531, UE 501 makes determination on whether the network has created any new mapped EPS bearer context without any association with to-be-created or already existing QoS flow. In step 532, UE 501 makes determination on whether an existing mapped EPS bearer context that is associated to a to-be-deleted QoS flow description has any other corresponding QoS flow description after the to-be-deleted QoS flow is deleted. In step 541, UE 501 sends a PDU session modification complete message to network 502.

If UE 501 detects that the network has created a new mapped EPS bearer context without any association with a to-be-created or an already existing QoS flow, then UE 501 initiates another PDU session modification procedure to delete the new mapped EPS bearer. Note that this scenario may occur during PDU session establishment or PDU session modification procedure. During PDU session establishment procedure, UE receives a QOS flow description IE and a mapped EPS bearer context IE carried by a PDU session establishment accept message. If the "create new EPS bearer" operation code in the mapped EPS bearer context IE was received, and there is no corresponding authorized QoS flow description IE in the same accept message, then the new mapped EPS bearer needs to be deleted. Similarly, during PDU session modification procedure, if the "create new EPS bearer" operation code in the mapped EPS bearer context IE was received in the PDU session modification command message, and there is no corresponding authorized QoS flow description IE in the same command message (or in previously received accept or command message), then the new mapped EPS bearer needs to be deleted.

In another scenario, an error in the authorized QoS flow description IE may also result in the UE locally remove a corresponding mapped EPS bearer. In one example, If the selected PDU session type of the PDU session is "Unstructured", the UE supports inter-system change from N1 mode to S1 mode, the UE does not support establishment of a PDN connection for the PDN type set to "non-IP" in S1 mode, and the parameters list field of one or more authorized QoS flow descriptions received in the authorized QoS flow descriptions IE of the PDU SESSION MODIFICATION COMMAND message contains an EPS bearer identity (EBI) then the UE shall locally remove the EPS bearer identity (EBI) from the parameters list field of such one or more authorized QoS flow descriptions. In another example, if the selected PDU session type of the PDU session is "Ethernet", the UE supports inter-system change from N1 mode to S1 mode, the UE does not support establishment of a PDN connection for the PDN type set to "non-IP" in S1 mode, the UE, the network or both of them do not support Ethernet PDN type in S1 mode, and the parameters list field of one or more authorized QoS flow descriptions received in the authorized QoS flow descriptions IE of the PDU SESSION MODIFICATION COMMAND message contains an EPS bearer identity (EBI), the UE shall locally remove the EPS bearer identity (EBI) from the parameters list field of such one or more authorized QoS flow descriptions.

The deletion of a QoS flow description may cause a mapped EPS bearer to have no corresponding QoS flow description. For example, a sematic or syntactic error in the authorized QoS flow description IE may result that the QoS flow description is to be deleted. If UE 501 detects that an existing mapped EPS bearer context that is associated to a to-be-deleted QoS flow description has no corresponding QoS flow description after the to-be-deleted QoS flow is deleted, then UE 501 also initiates another PDU session modification procedure to delete the existing mapped EPS bearer.

In step 551, UE 501 sends a PDU session modification request message to network 502. The PDU session modification request message carries a mapped EPS bearer context IE with "delete existing EPS" operation code, to delete any mapped EPS bearer that has no corresponding QoS flow. In step 552, UE 501 receives a PDU session modification command message from network 502. In step 553, UE 501 sends a PDU session modification complete message to network 502. After the PDU session modification procedure is completed, all mapped EPS bearer contexts stored in UE side are associated to corresponding QoS flow descriptions. As a result, after inter-system change from 5GS to EPS, all mapped EPS bearers will be established as EPS bearers in EPS, and the EPS bearers are associated to corresponding QoS flows.

Figure 6:
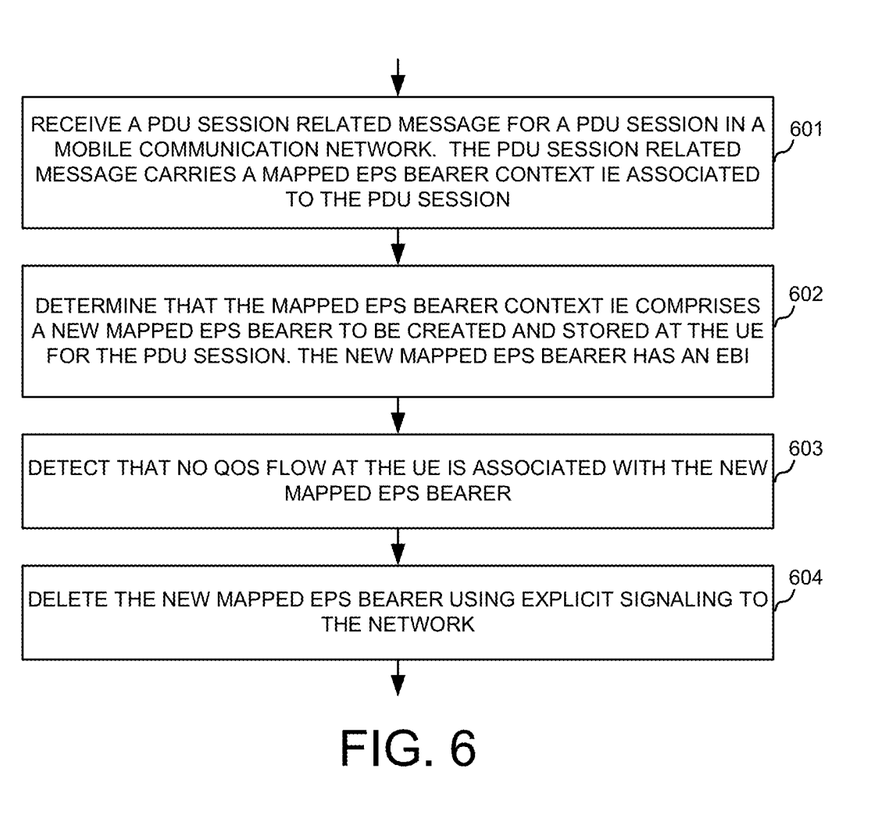
FIG. 6 is a flow chart of a method of handling mapped EPS bearer context for invalid QoS flow description in accordance with one novel aspect of the present invention.

FIG. 6 is a flow chart of a method of handling mapped EPS bearer context for invalid QoS flow description in accordance with one novel aspect of the present invention. In step 601, a UE receives a Protocol data unit (PDU) session related message for a PDU session in a mobile communication network. The PDU session related message carries a mapped evolved packet system (EPS) bearer context information element (IE) associated to the PDU session. In step 602, the UE determines that the mapped EPS bearer context IE comprises a new mapped EPS bearer to be created and stored at the UE for the PDU session. The new mapped EPS bearer has an EPS bearer identity (EBI). In step 603, the UE detects that no QoS flow at the UE is associated with the new mapped EPS bearer. In step 604, the UE deletes the new mapped EPS bearer using explicit signaling to the network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
receiving a Protocol data unit (PDU) session related message for a PDU session by a user equipment (UE) in a mobile communication network, wherein the PDU session related message carries a mapped evolved packet system (EPS) bearer context information element (IE) associated to the PDU session;
determining that the mapped EPS bearer context IE comprises a new mapped EPS bearer to be created and stored at the UE for the PDU session, wherein the new mapped EPS bearer has an EPS bearer identity (EBI);
detecting that no QoS flow at the UE is associated with the new mapped EPS bearer; and
deleting the new mapped EPS bearer using explicit signaling to the network.
2. The method of claim 1, wherein the PDU session related message is a PDU session establishment accept message by the network in response to a PDU session establishment request message by the UE.
3. The method of claim 2, wherein the PDU session establishment accept message carries the mapped EPS bearer context IE with a "create new EPS bearer" operation code for the new mapped EPS bearer.

4. The method of claim 1, wherein the PDU session related message is a PDU session modification command message carries the mapped EPS bearer context IE with a "create new EPS bearer" operation code for the new mapped EPS bearer.

5. The method of claim 1, wherein the PDU session related message carries a QoS flow description IE containing an error in an authorized QoS flow description.

6. The method of claim 1, wherein each QoS flow has a QoS flow description containing a parameters list, and wherein the parameters list comprises an EBI field.

7. The method of claim 6, wherein the detecting involves finding no QoS flow at the UE that is associated with the same EBI of the new mapped EPS bearer.

8. The method of claim 1, wherein the explicit signaling is a PDU session modification request message for deleting the new mapped EPS bearer.

9. The method of claim 1, further comprising:
receiving a PDU session modification command message for deleting a QoS flow that is associated to an existing mapped EPS bearer, wherein the existing mapped EPS bearer has no corresponding QoS flow after the QoS flow is deleted; and
deleting the existing mapped EPS bearer using explicit signaling to the network.

10. The method of claim 1, wherein the UE performs inter-system change from 5GS to EPS, and wherein every mapped EPS bearer stored in the UE is established as a corresponding EPS bearer in EPS.

11. A User Equipment (UE), comprising:
a receiver that receives a Protocol data unit (PDU) session related message for a PDU session in a mobile communication network, wherein the PDU session related message carries a mapped evolved packet system (EPS) bearer context information element (IE) associated to the PDU session;
a control and config circuit that determines that the mapped EPS bearer context IE comprises a new mapped EPS bearer to be created and stored at the UE for the PDU session, wherein the new mapped EPS bearer has an EPS bearer identity (EBI), wherein the control circuit also detects that no QoS flow at the UE is associated with the new mapped EPS bearer; and
a PDU session handling circuit that deletes the new mapped EPS bearer using explicit signaling to the network.

12. The UE of claim 11, wherein the PDU session related message is a PDU session establishment accept message by the network in response to a PDU session establishment request message by the UE.

13. The UE of claim 12, wherein the PDU session establishment accept message carries the mapped EPS bearer context IE with a "create new EPS bearer" operation code for the new mapped EPS bearer.

14. The UE of claim 11, wherein the PDU session related message is a PDU session modification command message carries the mapped EPS bearer context IE with a "create new EPS bearer" operation code for the new mapped EPS bearer.

15. The UE of claim 11, wherein the PDU session related message carries a QoS flow description IE containing an error in an authorized QoS flow description.

16. The UE of claim 11, wherein each QoS flow has a QoS flow description containing a parameters list, and wherein the parameters list comprises an EBI field.

17. The UE of claim 16, wherein the detecting involves finding no QoS flow at the UE that is associated with the same EBI of the new mapped EPS bearer.

18. The UE of claim 11, wherein the explicit signaling is a PDU session modification request message for deleting the new mapped EPS bearer.

19. The UE of claim 11, wherein the UE receives a PDU session modification command message for deleting a QoS flow that is associated to an existing mapped EPS bearer, wherein the existing mapped EPS bearer has no corresponding QoS flow after the QoS flow is deleted, and wherein the UE deletes the existing mapped EPS bearer using explicit signaling to the network.

20. The UE of claim 11, wherein the UE performs inter-system change from 5GS to EPS, and wherein every mapped EPS bearer stored in the UE is established as a corresponding EPS bearer in EPS.

* * * * *